United States Patent [19]

Shuster et al.

[11] Patent Number: 4,762,758
[45] Date of Patent: Aug. 9, 1988

[54] INTERELECTRODE SEPARATOR SYSTEM FOR ELECTROCHEMICAL CELLS

[75] Inventors: Nicholas Shuster, Madison; Jerome F. Pallat, Fairport Harbor, both of Ohio

[73] Assignee: Gould Inc., Rolling Meadows, Ill.

[21] Appl. No.: 808,096

[22] Filed: Dec. 12, 1985

[51] Int. Cl.$^4$ .............................................. H01M 2/16
[52] U.S. Cl. .................................... 429/144; 429/66; 429/129
[58] Field of Search .................. 429/129, 67, 144, 51, 429/66

[56] References Cited

U.S. PATENT DOCUMENTS 4,555,454 11/1985 Schuster ........................... 429/67 X Primary Examiner—John F. Niebling
Assistant Examiner—Steven P. Marquis
Attorney, Agent, or Firm—Marshall, O'Toole, Gerstein, Murray & Bicknell

[57] ABSTRACT

A separator system for electrochemical cells whereby a reactive metal anode and active porous cathode are isolated from one another while the uniformity and turbulence of the electrolyte flow therebetween is increased. The separator system includes a rigid porous member adjacent to the cathode and a resilient porous member adjacent to the rigid porous member and between the rigid porous member and the anode. This orientation of the separator system components results in a cell having improved controllability and reduced polarization during operation.

13 Claims, 1 Drawing Sheet

INTERELECTRODE SEPARATOR SYSTEM FOR ELECTROCHEMICAL CELLS

BACKGROUND OF THE INVENTION

1. Field of the Invention

This invention generally relates to electrochemical cells and, more particularly, this invention relates to interelectrode separator systems useful in electrochemical cells.

2. Description of Related Art

Electrochemical cells utilizing consumable, reactive metal anodes are well known. Typically, the anode comprises an alkali metal, such as lithium, in elemental, compound or complex form, in conjunction with a cathode and an aqueous alkaline electrolyte. In a preferred form, the anode is lithium, the cathode is an active, porous material such as silver oxide, and the electrolyte comprises an aqueous solution of lithium hydroxide. Such cells are described in detail in Rowley U.S. Pat. No. 3,791,871 issued Feb. 12, 1974 and in Momyer et al, U.S. Pat. No. 4,269,907 issued May 26, 1981, the respective disclosures of which are incorporated herein by reference.

Electrochemical cells utilizing a nonconductive flow screen to separate a reactive metal anode from a cathode are well known. Typically, a porous, expandable element is positioned between the flow screen and the cathode to maintain essentially uniform dimensions for the electrolyte flow channel defined between the electrodes as the anode is consumed during cell operation. This element is of a thickness and porosity such that it can be compressed and yet allow the electrolyte to pass through it freely. As the anode is consumed during operation, the porous element expands from its initial compressed state against the flow screen which is positioned against and between the anode and the porous element, thereby maintaining the flow screen in position against the anode at all times during cell operation. Such a cell is described in detail in Momyer et al, U.S. Pat. No. 4,269,907.

Shock contact between the anode and cathode can cause a highly exothermic spontaneous reaction. Separator systems such as that described in Momyer et al serve to keep the active electrode materials isolated from one another. The rigid plastic screen, typically of polypropylene, provides rigid separation while the porous, expandable element, such as a compressible reticulated foam, adds to the shock and vibration resistance. Such a foam also may promote turbulent flow of electrolyte between the electrodes. Turbulent uniform flow reduces cell polarization and allows discharge at high power levels.

All previous studies have been conducted with a rigid porous separator member disposed adjacent and in direct contact with the reactive metal anode. Laying a heavy screen directly against a lithium surface can, however, cause voltage loss due to polarization, with consequently increased heat production, both of which are undesirable.

SUMMARY OF THE INVENTION

It is an object of the invention to overcome one or more of the problems described above.

According to the invention, a reactive metal anode in an electrochemical cell is separated from a cathode by means of a separator system. The separator system comprises a rigid, electrically non-conductive porous member disposed adjacent the cathode and a resilient, electrically non-conductive porous member disposed between the anode and the rigid porous member and adjacent the anode.

More specifically, the rigid porous member may take the form of a rigid screen made of a plastic material such as polypropylene and the resilient porous member is in the form of a compressible reticulated foam material such as a polyether urethane.

This orientation of the separator system components results in a cell having reduced polarization during operation, improved controllability, and lower heat evolution.

Other objects and advantages of the invention will be apparent to those skilled in the art from the following detailed description taken in conjunction with the drawings and the appended claims.

DETAILED DESCRIPTION OF THE INVENTION

As is well known in the art, reactive metal electrochemical cells generally comprise an anode of a reactive metal, a cathode and an aqueous electrolyte which contacts at least a portion of the anode and the cathode during operation of the cell. Each of the anode and the cathode are connected to a terminal, and the respective terminals are connected to a load during operation.

The anode is typically an alkali metal, preferably lithium. The anode may be present in elemental, compound, complex, alloy, amalgam or mixture form, as is well known in the art.

The cathode may be any suitable material. The anode and the cathode are preferably spaced from each other by a mechanical separator system.

Figure 1:
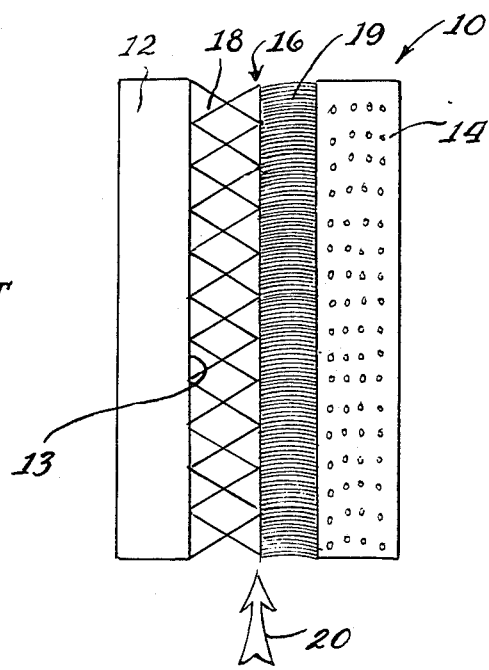
FIG. 1 is an enlarged cross-sectional schematic view of a typical electrochemical cell construction of the prior art.

FIG. 1 illustrates the orientation of the electrochemical cell components according to the prior art. The electrochemical cell is generally designated 10 and comprises a reactive metal anode 12 defining a reactive surface 13, a cathode 14 spaced from the anode 12 and a cell separator system 16 disposed between the anode 12 and the cathode 14.

The cell separator system 16 illustratively comprises a screen 18 disposed adjacent the anode 12 and a layer 19 of reticulated foam disposed between the screen 18 and the cathode 14.

In practice, each of the anode 12 and the cathode 14 may comprise a flat plate with electrolyte flowing in the direction of the arrow 20 through the interelectrode gap defined between the anode 12 and the cathode 14 and in which the separator system 16 is disposed.

Figure 2:
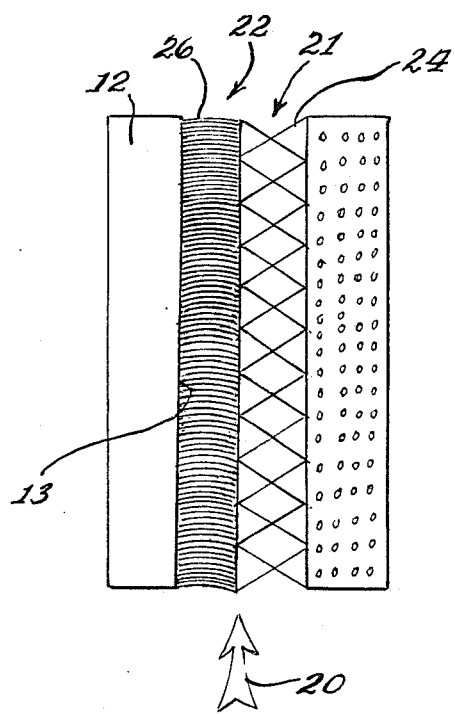
FIG. 2 is an enlarged cross-sectional schematic view of an electrochemical cell of the present invention.

FIG. 2 illustrates an electrochemical cell 21 of the present invention. The cell 21 comprises a reactive metal anode 12, a cathode 14 spaced from the anode 12, and a separator system 22 comprising a rigid screen 24 disposed adjacent the cathode 14, and a compressible reticulated foam layer 26 disposed adjacent the rigid screen 24 and between the screen 24 and the anode 12.

Preferably, the screen 24 is in direct mechanical contact with the cathode 14, and the foam 26 is in direct mechanical contact with both the anode surface 13 and with the screen 24.

A cathode made of an active porous material is preferred, with silver oxide (AgO) being highly preferred.

Separator systems are employed in electrochemical cells to serve several vital functions, including those identified above. The electrode separator system of the present invention minimizes polarization and results in acceptably uniform anode wear.

In a preferred embodiment of the invention, the relative positions of the anode 12 and the cathode 14 will be fixed, and the size of the gap defined therebetween will increase during cell operation, due to chemical consumption of the anode surface 13. As the gap increases in size, the foam 26 will expand in order to maintain contact with both the anode surface 13 and the screen 24, thus maintaining turbulent flow and preventing detrimental channeling of electrolyte.

All previous studies have been conducted with the rigid screen member of the separator system disposed against the reactive metal anode, as shown in FIG. 1. Unlike a material which can react throughout its structure, such as silver oxide, the reaction occurring at a reactive metal anode made of lithium occurs at the surface (e.g. surface 13 in FIG. 1) of the anode. Unfortunately, laying a heavy screen directly on a lithium surface can cause voltage loss due to polarization. This arises from the fact that the screen can occlude a considerable amount of area. Consequently, the area of lithium exposed to electrolyte and actually available for reaction is reduced, resulting in higher localized current densities.

Reversing the orientation of the separator system components, as in the present invention, allows more exposed lithium surface to react while the screen, disposed against the porous cathode, has little or no detrimental effect.

Tests confirm that no loss of performance is experienced in electrochemical cells with the orientation of the invention. Indeed, performance may be enhanced with the system of the invention. These tests also confirm that a cell with the separator orientation of the invention is very controllable (primarily or solely via electrolyte flow adjustment) and permits maintenance of flat power discharges over time.

Selection of specific separator system components is governed by such factors as the initial interelectrode gap, specific pressure drop limitations, and the presence or absence of precipitates which could cause detrimental local plugging. Some generic guidelines are presented below.

| Initial Gap (mils) | Maximum Allowable Screen Thickness (mils) | Foam Characteristic |
|---|---|---|
| 30 | 25 | 1/16–1/8" Thick Foam - Typically 20–60 ppi |
| 23 | 17 | 1/16–1/8" Thick Foam - Typically 20–60 ppi |
| 15 | 9–10 | 1/16–1/8" Thick Foam - Typically 20–60 ppi |

Both the screen and foam materials must be chemically stable with respect to the anode material and the aqueous electrolyte.

Suitable interelectrode separator system components include, but are not limited to:

a. A sixteen mil polypropylene screen such as that of Lamport's Filter Media of Cleveland, OH, combined with a ⅛" thick polyurethane foam of 20 ppi such as that sold under the commercial designation "Type IV Military Foam" by Scotfoam Corp. of Eddystone, PA;

b. A ten mil woven-calendered polypropylene screen such as No. O-61611 of Lamport's Filter Media of Cleveland, OH combined with a ⅛" thick polyurethane foam such as that sold under the commercial designation "Type IV Military Foam" by Scotfoam Corp. of Eddystone, PA; and c. A sixteen mil polypropylene screen such as Style 7715 of Lamport's Filter Media of Cleveland, OH combined with a 3/32" thick, 51 ppi polyurethane foam such as that sold by Recticel Corp. of Chardon, OH.

Typically, the rigid screen is made of polypropylene, with the thickness depending upon the initial interelectrode gap. Typical compressible reticulated foam materials used in the present invention include polyurethane foam with 20–60 ppi, polyether urethanes being highly preferred. Some polyester urethanes are unstable in alkali metal/aqueous alkaline electrolyte systems, depending on the particular temperature and exposure time.

The foregoing detailed description is given for clearness of understanding only, and no unnecessary limitations are to be understood therefrom, as modifications within the scope of the invention will be obvious to those skilled in the art.

What is claimed is:

1. An electrochemical cell, comprising:
a reactive metal anode;
a cathode spaced from said anode; and means for separating said anode and cathode disposed between said anode and cathode, said separating means comprising a non-conductive porous member disposed adjacent said cathode and a resilient non-conductive porous member disposed adjacent rigid porous member between said rigid porous member and said anode.

2. The electrochemical cell of claim 1 wherein said rigid porous member is in direct mechanical contact with said cathode and said resilient porous member is in direct mechanical contact with said anode and said rigid porous member.

3. The electrochemical cell of claim 1 wherein the relative positions of each of said anode and said cathode are fixed.

4. The electrochemical cell of claim 1 wherein said reactive metal comprises an alkali metal.

5. The electrochemical cell of claim 4 wherein said alkali metal comprises lithium.

6. The electrochemical cell of claim 1 wherein said cathode comprises an active porous material.

7. The electrochemical cell of claim 6 wherein said active porous cathode comprises silver oxide.

8. The electrochemical cell of claim 1 wherein said resilient porous member comprises a compressible reticulated foam material.

9. The electrochemical cell of claim 8 wherein said compressible reticulated foam material comprises polyether urethane.

10. The electrochemical cell of claim 1 wherein said rigid porous member comprises a rigid plastic screen.

11. The electrochemical cell of claim 10 wherein said rigid plastic comprises polypropylene.

12. The electrochemical cell of claim 10 wherein said resilient porous member comprises a compressible reticulated foam material.

13. The electrochemical cell of claim 12 wherein said compressible reticulated foam material comprises polyether urethane.

* * * * *